A. B. BEAUMONT.
Broadcast Sower.
No. 79,301. Patented June 30, 1868.
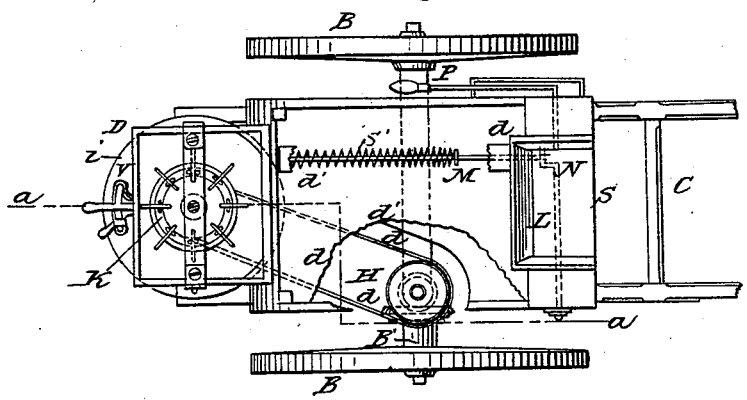
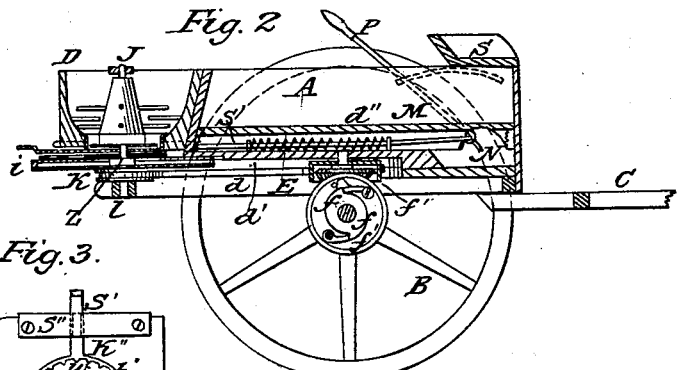
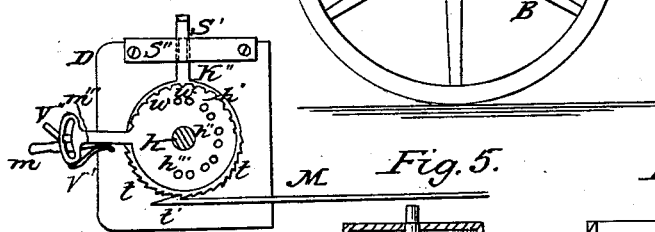
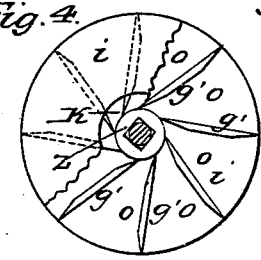
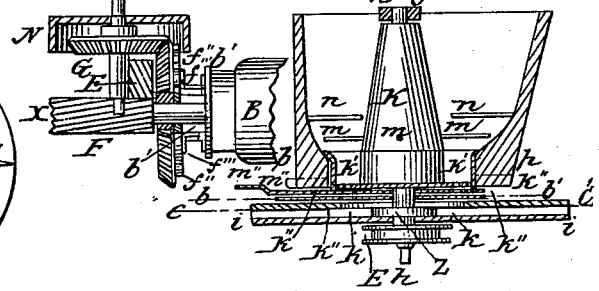
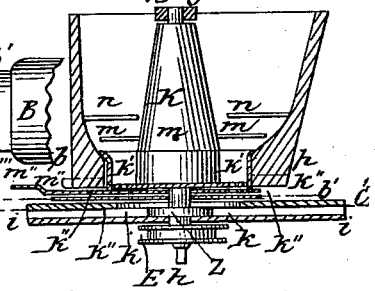
Witnesses:
Theo Tuscke
J. A. Service
Inventor:
A. B. Beaumont
per Munn & Co.
Attorneys

United States Patent Office.

ALFRED B. BEAUMONT, OF GRAND RAPIDS, MICHIGAN.

Letters Patent No. 79,301, dated June 30, 1868.

IMPROVEMENT IN BROADCAST SOWER.

*The Schedule referred to in these Letters Patent and making part of the same.*

TO ALL WHOM IT MAY CONCERN:

Be it known that I, ALFRED B. BEAUMONT, of Grand Rapids, in the county of Kent, and State of Michigan, have invented a new and improved Broadcast Sower; and I do hereby declare that the following is a full, clear, and exact description thereof, which will enable those skilled in the art to make and use the same, reference being had to the accompanying drawings, forming part of this specification.

The nature of this invention consists in constructing a centrifugal broadcast-sowing machine with mechanism for regulating the supply of the seed or grain, and other parts perfecting the whole.

Figure 1 is a top view of my invention.

Figure 2 is a vertical section of same through the line $a\ a'$, fig. 1.

Figure 3 is a detail view of the feed-adjuster $b\ b'$, fig. 6, when seen from beneath.

Figure 4 is a detail view of scattering-wheel at $c\ c'$, fig. 6, with a part of the top disk removed.

Figure 5 is the bevel-gearing, showing the coupling-device.

Figure 6 is an enlarged view of the section through the hopper.

Similar letters of reference indicate corresponding parts.

In a general description of the parts—

A is the box or body.

B, the wheels.

C, the shafts.

D, the hopper.

F, the bevel-wheel or pinion, which is coupled to the hub of the wheel B, in a manner hereinafter shown.

This gears into another pinion, G, carrying a pulley, H, shown at fig. 5.

This pinion works upon a vertical pin in the body of the machine, its lower end being in the axle $x$.

Thus the motion of the wheels is communicated to the pulley H, which transmits the same through a belt or chain, $d$, to a small pulley, E, on the shaft $h$ of the scattering-wheel $i$.

The hopper D has an opening at its base, which admits the grain into the scattering-wheel beneath, whence the grain is thrown out radially through openings in the said wheel.

This scattering-wheel consists of two disks separated by radial strips, $g$, fig. 4, which, with the two disks, form channels, $o$, for discharging the grain.

The lower disk is entire, with the exception of the hole for the shaft $h$, but the upper disk has a large central opening for receiving the grain into the interior of the wheel, as shown at $k\ k$, figs. 4 and 6.

By referring to fig. 6, a sectional view of all the parts within and connected with the hopper D is shown.

This hopper is firmly bolted on to the end or hind gate of the body A, having a cross-piece, $j$, which furnishes the upper bearing of the shaft of the scattering-wheel.

The lower bearing is shown at $l$, fig. 2, in a cross-piece forming a part of the body of the machine.

Upon the shaft $h$ is secured a cone, K, the office of which is to guide the grain to the holes in a disk hereinafter described, provided with radial arms, $m$, which pass, without contact, the arms $n$, projecting from the inside of the hopper.

The base of this cone is a circular metallic disk mounted on the shaft $h$, and extending across and with easy contact of its perimeter, closing the throat of the hopper.

This disk is seen in fig. 6, at $k'$, and is perforated with oblong openings, which are also shown in fig. 1.

These openings extend all the way around.

The throat of the hopper is fitted with a metallic bottom, $k''$, and has its vertical or cylindrical part, $p$, slightly flared at the top to retain it in place in the throat of the hopper.

This bottom, $k''$, is perforated with a series of holes near its perimeter, said holes reaching only half way round the same.

By means of its flared cylindrical sides, this bottom can rotate partially within the throat of the hopper, an arm, $m''$, being placed on the same.

The object of this partial rotation is to bring the said holes over or away from similar holes in another disk, $k'''$, indicated in fig. 6 by the red line $b\ b'$, and shown in detail at $k'''$, fig. 3. It has an arm, $m'''$.

In this figure the disk $k''$ is shown from beneath, and it is provided with ratchet-teeth, $t$, half way round its perimeter, for a purpose to be shown.

The arm $m''$ being shown connected with the slotted arm $m'''$, belonging to the disk $k'''$, with a set-screw and spring, also to be explained.

A stop, $s''$, fits into the notches $n''$ on the disk $k'''$, also to be explained.

The operation of these three disks is as follows:

Motion is communicated to the shaft $h$ by means of the belt $d$ and pulley E. The cone $k$ revolves, and also the first disk $k'$. The grain, guided by the cone, passes down through the aforesaid oblong holes in the disk $k'$ and falls upon the disk $k''$, when, if the holes in $k''$ are partially or fully open, it passes into the scattering-wheel $i$, and by the centrifugal action of the latter is thrown out radially.

The arm $m''$ on the disk $k''$ is in juxtaposition beneath the arm $m'''$ on the disk $k'''$.

The arm $m'''$ is provided with a slot, $v$, spring, $v'$, and set-screw, $v''$, to keep the two disks stationary when the holes in each are adjusted, for the spring $v'$ bears against the arm $m''$ on one side, and the set-screw $v''$ bears against it on the other, thus holding the two arms stationary, and consequently the disks to which they belong.

This device is thus a gauge to regulate the flow of grain, by keeping the holes in the disks $k''$ and $k'''$ adjusted with each other. The set-screw prevents the rotation of the disk $k''$ in one direction only, which is the direction of the serrated teeth on the disk $k''$, but in the reverse direction the said disk can move against the spring $v'$, and is held only by the tension of said spring, which allows it sufficient movement to completely remove its holes from coincidence with those of the disk $k'''$, thus partially or wholly shutting off the supply of grain, if desired, and by this device a given quantity can be sown per acre with accuracy, or the feed of the grain can be adapted to the fast or slow pace of the horse drawing the machine.

Another movement of the disk $k''$ is produced at will by the driver, by means of a rod, M, figs. 1 and 2, which is connected with an arm, N, on a shaft, L, to which is attached a vertical lever, P, working by the side of the driver's seat S.

This rod M is provided with a spring, S', which is contracted with the forward movement of the lever P.

This forward movement of said lever and its rod M causes the hook $t'$ to catch into a tooth on the disk $k''$, and thus partially rotate the same against the tension of the spring $v'$ on the arm $m'''$ of the disk $k'''$, acting against the arm $m''$ of the disk $k''$, and thus the disks are partially rotated till their holes partially or fully pass each other, which produces a partial or complete closing of the same.

When the lever P is liberated, the spring S' carries the rod M back to its normal position, in which position the hook $t'$ is clear from and not in contact with the ratchet-teeth of the disk $k''$.

Thus, by moving the lever P forward or backward, the holes in the disks are closed or opened respectively, and the discharge of the grain regulated at the will of the driver, and independent of the gauge before described as the spring $v'$ operates to bring the holes of the disks into coincidence, when the lever P, with its rod and hook, is liberated or moved partially backward.

There is a stop, S'', attached to a plate, S''', on the bottom D' of the hopper.

This stop has a pointed end, which fits into V-shaped notches, $n''$, on the periphery of the disk $k'''$, having for its object the adjustment of the two disks, with reference to the point of discharge of the grain from the wheel, for if it be found that the wheel is discharging the grain too much to the right or left, the two disks can be rotated to the left or right, and their holes brought to deliver the grain into the channels $o$ at such a point as will counteract the objectionable tendency aforesaid.

This is operated by hand, and the simplest form is that of the pin S'' moving in and out in a slot made in the plate S''', which plate is screwed to the bottom, D', as before mentioned.

The holes in the two disks being in the front half of the same, the grain is deposited into the scattering-wheel in one half of its channels $o$, and this being thrown out to the rear of the machine, none of the grain is thrown forward under the wheels, as would be the case if the whole of the channels were fed with the grain at the same time.

The bevel-gearing, shown at fig. 5, has one wheel, G, attached within the pulley H, which it drives, both being on a vertical shaft having its bearings in the frame and floor of the body of the machine.

The wheel F works freely on a reduced part of the axle X, fig. 5, and is on the same centre of rotation with the running-wheel B and a ratchet-disk, now to be described.

Working with easy contact by the side of the bevel-wheel F is this ratchet-disk $f$, having on its periphery two ratchets $f'$, to catch against the pawls $f''$ pivoted to the face of the bevel-wheel F, and provided each with a small spring, to bear them down upon the ratchet-disk $f$, so that when the motion of the scattering-wheel is accelerated, by its own momentum, beyond the proportionate speed of the wheels B, it will turn without hindrance, and no strain will come suddenly upon the belt $d$ or the gearing, from any sudden stoppage of the forward movement of the machine.

The machine can thus be backed, also, without communicating motion to the scattering-wheel or gearing, as in this reversed motion the pawls will slip over in the manner common with ratchets.

When the machine is transported from place to place, it can be thrown out of gear with the scattering-wheel and its connections, by lifting the pawls $f'$, and securing them above the ratchet with small screws, so that they will not engage with the said ratchet-disk, thus leaving the wheel F to slip freely on its axis, the pawls $f''$ slipping over the ratchet-teeth $f'$.

In fig. 5, the hub B' is shown partly withdrawn from its axle, the better to exhibit the clutches $f'''$ on the face of the ratchet-wheel $f$, and the corresponding projections $b'$ on the proximate face of the hub B', which when the hub B is in its proper place, its projections $b'$ will be in contact with the clutches $f'''$, and, either in a forward or backward motion of the wheel, will impinge on the said clutches or projections $f'''$.

There are two of these projections on the disk $f$, and two on the hub $B'$, and are placed near the perimeter of their respective faces, and form a species of coupling for transmitting the motion from the hub to the disk, for when the former is rotated, its projections, impinging against those on the disk, rotate the latter, and with it the bevel-wheel F, by means of the aforesaid pawls $f''$ and ratchet-teeth $f'$.

This will be the case only in the forward motion of the hub. In the backward motion of it the pawls $f''$ will slip around on the periphery of the disk $f$, and thus communicate no motion to the bevel-wheels, as before mentioned.

The bevel-gears, the belt $d$, pulley E, and scattering-wheel $i$, are underneath the bottom, $d'$, of the body of the machine, as shown in figs. 1 and 2.

The rod M, and its spring $S'$, are protected from the load of grain in body A of the machine, by a box, $d''$, shown with its side removed in fig. 2, and shown with its top removed in fig. 1.

The circular block $z$, in the centre of the scattering-wheel, is placed there for the better attachment of the scattering-wheel to its shaft. It forms a part of the wheel, and has a square hole, to fit a squared portion of the shaft $h$.

The end and object of this broadcast-sower are not exclusively the sowing of grain. Its devices are contrived also with a view of supplying another want of agriculturists, which is the sowing of plaster and other fertilizers; and the hopper D and cone K are provided with the arms $m$ and $n$, before described, for the purpose of loosening up the plaster or any fertilizer, and preventing the same becoming bedded or packed by the jolting of the machine or the superincumbent weight of the material itself. The arms also serve to break up any clods or accretions in the fertilizing-material.

The practical proportional structure of the machine admits of an exceedingly narrow gauge in its running-gear, and the wheels B may be placed on an axle of four feet or less, thus permitting them to pass with facility over rough ground, and from the proximity of its wheels, it can be driven between stumps and other irregularities of the surface, thereby avoiding the shocks and concussions incident to the wider machines under similar circumstances.

Fig. 3 exhibits the disks working on the shaft $h$, the stop and arms provided with spring-slot and set-screw, together with the notches in one disk and the ratchet-teeth on the other, and the rod M, with its hook, catching on said ratchet-teeth, thus connecting it with the driver.

This device, working in the throat of the hopper, and over the centre of the scattering-wheel, thus affords a simple adjustable feed or gauge to regulate or entirely shut off the supply of grain or fertilizing-material at the will of the driver.

The semicircular arrangement of the holes in said disks, delivering the grain or plaster into the scattering-wheel at the place where it is found most desirable, and the stop $S''$ for adjusting such delivery, working under a plate, $S'''$, screwed into the wooden bottom, $D'$, of the hopper, constitute important features of my machine.

I claim as new, and desire to secure by Letters Patent—

1. The adjustable disks $k''$ $k'''$, for regulating the discharge of the grain, substantially as and for the purposes shown and described.
2. The stop $S''$, in combination with the disk $k'''$, substantially as and for the purpose shown and described.
3. Arm $m''$, substantially as and for the purposes shown and described.
4. Arm $m'''$, substantially as and for the purposes shown and described.
5. The slot $v$ on the arm $m'''$, substantially as and for the purposes shown and described.
6. The spring $v'$ on the arm $m'''$, substantially as and for the purposes shown and described.
7. Operating the disk $k''$, by means of a rod, M, spring $S'$, lever P, and hook $t$, or other equivalent devices, substantially as and for the purposes shown and described.
8. The guiding-cone K, substantially as and for the purposes hereinbefore shown and described.
9. The arms $m$ and $n$ of the cone and hopper, substantially as and for the purposes shown and described.
10. Constructing a scattering-wheel, $i$, with a central opening, $k$, and channels $o$, whereby the grain can pass into a portion of its said channels, substantially as and for the purposes specified and shown.
11. The cylindrical sides $p$ of the disk $k''$, for the purpose of retaining the latter in the throat of the hopper, whereby the said disk is permitted to partially rotate, substantially as and for the purposes hereinbefore described.
12. The bevel-wheel F on the axle $x$, and connected with an independent ratchet-disk $f$, substantially as and for the purposes hereinbefore shown and described.
13. The hollow pulley H, with its bevel-wheel G within it, in combination with a grain-sowing machine, substantially as and for the purpose shown and described.
14. The coupling-devices $f'''$ $b'$, in combination with a grain-sowing machine, substantially as and for the objects shown and described.
15. The disk $k'$ attached to the cone K, and provided with openings for dropping the grain or plaster, substantially as and for the purposes shown and described.

ALFRED B. BEAUMONT.

Witnesses:
 THOMPSON SINCLAIR,
 ALBERT HEAD.